US008594367B2

(12) United States Patent
Ohira

(10) Patent No.: US 8,594,367 B2
(45) Date of Patent: Nov. 26, 2013

(54) IMAGE PROCESSING APPARATUS, IMAGE FORMING APPARATUS, RECORDING MEDIUM AND IMAGE PROCESSING METHOD

(75) Inventor: Masakazu Ohira, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 134 days.

(21) Appl. No.: 13/251,313

(22) Filed: Oct. 3, 2011

(65) Prior Publication Data

US 2012/0082337 A1 Apr. 5, 2012

(30) Foreign Application Priority Data

Oct. 4, 2010 (JP) ................................. 2010-225145

(51) Int. Cl.
*G06K 9/00* (2006.01)
*H04N 1/40* (2006.01)

(52) U.S. Cl.
USPC ........................... 382/100; 382/165; 358/3.28

(58) Field of Classification Search
USPC ......... 382/100, 103, 112–116, 135–139, 155, 382/162, 165, 173, 181, 219, 232, 254, 274, 382/276, 291, 305, 312; 162/10; 358/1.13, 358/3.28; 455/556.1
See application file for complete search history.

(56) References Cited

U.S. PATENT DOCUMENTS

| 7,006,247 | B1 | 2/2006 | Sekine et al. | |
| 7,639,835 | B2* | 12/2009 | Hayashi | 382/100 |
| 8,004,698 | B2* | 8/2011 | Sano | 358/1.13 |
| 8,045,794 | B2* | 10/2011 | Yamaguchi et al. | 382/162 |
| 8,182,651 | B2* | 5/2012 | Rosset et al. | 162/110 |
| 8,385,971 | B2* | 2/2013 | Rhoads et al. | 455/556.1 |

FOREIGN PATENT DOCUMENTS

| JP | 2002-27236 A | 1/2002 |
| JP | 2005-115873 A | 4/2005 |
| JP | 2007-88763 A | 4/2007 |
| JP | 2007-129427 A | 5/2007 |
| JP | 2007-251400 A | 9/2007 |
| JP | 2010-212813 A | 9/2010 |

\* cited by examiner

*Primary Examiner* — Seyed Azarian
(74) *Attorney, Agent, or Firm* — Birch, Stewart, Kolasch & Birch, LLP

(57) ABSTRACT

When original image data obtained by reading an original document is to be joined with watermark data associated with a watermark for copy control which appears as a result of making a copy, whether the original document includes a chromatic color or not is determined on the basis of the original image data. When the original document includes a chromatic color, the original image data is joined with chromatic watermark data. When the original document includes an achromatic color, the original image data is joined with achromatic watermark data.

11 Claims, 13 Drawing Sheets

F I G. 5A
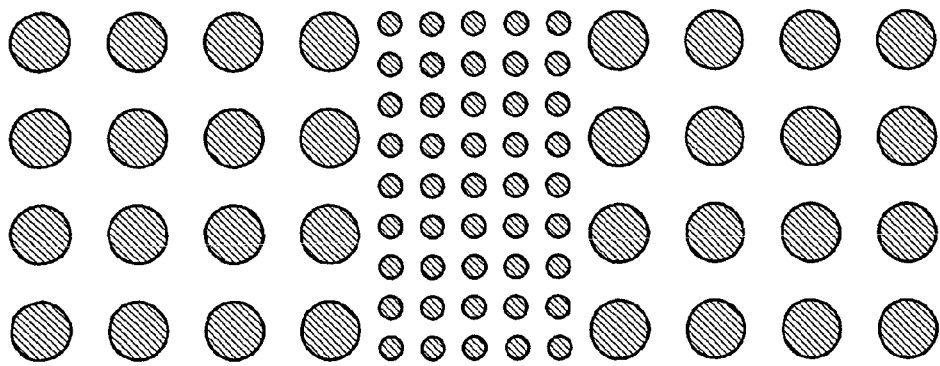
F I G. 5B
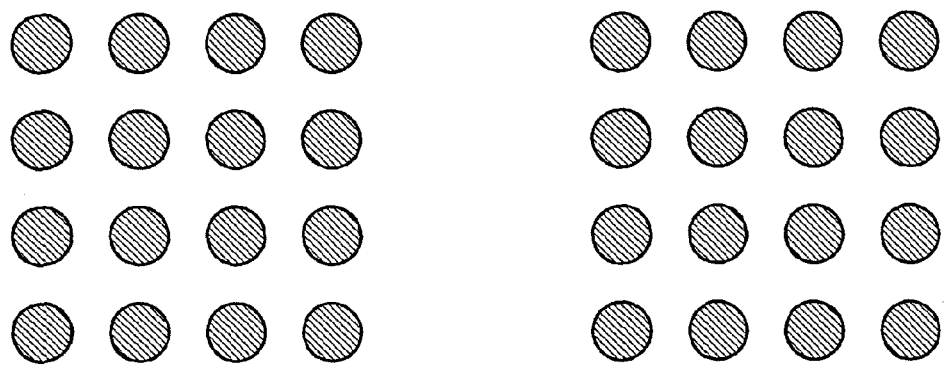

SMALL DOT
PATTERN

ILLEGAL
COPY WARNING
PATTERN DATA

LARGE DOT
PATTERN

SMALL DOT PATTERN — LARGE DOT PATTERN

WATERMARK DATA

IMAGE PROCESSING APPARATUS, IMAGE FORMING APPARATUS, RECORDING MEDIUM AND IMAGE PROCESSING METHOD

CROSS-REFERENCE TO RELATED APPLICATIONS

This Nonprovisional application claims priority under 35 U.S.C. §119(a) on Patent Application No. 2010-225145 filed in Japan on Oct. 4, 2010, the entire contents of which are hereby incorporated by reference.

BACKGROUND

1. Technical Field

The present invention relates to an image processing apparatus, an image forming apparatus, an image processing method, a computer program and a recording medium, in which a determination result of ACS (Auto Color Selection) is allowed to be reflected in formation of a watermark for copy control that appears as a result of making a copy.

2. Description of Related Art

Certified copies (e.g., family registers and certificates of residence) published by official agencies on the basis of original documents containing personal information are widely used as papers for authenticating individuals. In order to ensure the function as papers for authenticating individuals, certified copies are required to be distinguished clearly from duplications thereof. Moreover, certified copies published by official agencies require measures to protect privacy, since personal information is contained therein.

Documents printed on the basis of original documents in companies also require measures to protect privacy as well as the certified copies described above, since personal information such as customer information is sometimes contained therein. Moreover, when commercial or technical confidential information is contained in documents created in companies, it is necessary to prevent leakage of the documents to a third party who is under no obligation to keep secrets.

Japanese Patent Application Laid-Open No. 2007-88763 discloses a print control unit for causing a computer to join contents data (original image data) indicative of information contained in an original document with watermark data indicative of a watermark for copy control (e.g., a text or a mark for warning such as "Copy", "Copy Prohibited" or "Confidential"), which is invisible in a certified copy or a document but appears in a duplication of a certified copy or a document made by a copying machine, and printing a certified copy or a document on the basis of obtained composite data. The print control unit can cause a computer to join original image data with watermark data and print an image associated with the watermark data and the original image data on a normal paper, eliminating the need to use an anti-copying and anti-counterfeiting paper having the above-described watermark for copy control printed thereon in advance. Moreover, the user is allowed to select easily a watermark appropriate for the information contained in a certified copy or a document.

In recent years, an image forming apparatus for causing an image reading unit to read an original document printed on a paper to generate original image data and joining the generated original image data with watermark data has also been proposed in view of a case where the original document is not digitized. The apparatus creates an image showing a certified copy or a document. Some image forming apparatuses enable formation of a chromatic (color) image showing a certified copy or a document and advance specification of a chromatic color to be used for a watermark for copy control.

SUMMARY

The printing costs of formation of a chromatic image showing a certified copy or a document is higher than that of an achromatic (monotone) image, since toners of a plurality of colors are used to form a chromatic image. Moreover, when an image forming apparatus capable of forming a chromatic image is used for printing service employing printer accounting, the charge for a chromatic image is generally higher than the charge for an achromatic image. Accordingly, the user usually desires to use chromatic image formation only for a chromatic document part when the original document is composed of a plurality of document parts which are printed chromatically and achromatically.

In order to form a chromatic image only when a chromatic document part is read as described above and to reduce the printing costs and the charge, it can be considered to apply the ACS to the image forming apparatus for determining whether a read-out document part is a chromatic document part or not and to form a chromatic image only when a chromatic document part is read.

However, in a case where a chromatic color to be used for a watermark for copy control is specified in advance as described above, a watermark is formed in a specified chromatic color even when a read-out document part (original document) is an achromatic document part and the determination result of ACS indicates an achromatic color. In such a case, chromatic toner or ink is used even though an original document is an achromatic (monotone, black-and-white) original document, and accounting for color output is generally executed.

The function of ACS is intended to use black-and-white printing for an achromatic original document as described above so as to reduce the copying costs and to use color printing only for a chromatic original document. However, the prior art have a problem that image printing in a case where the function of ACS is in an enabled state and a chromatic watermark is specified produces the same result as a case where the ACS essentially does not function. The prior art also have a problem that color materials such as toner or ink are consumed unnecessarily, though a watermark for copy control is intended to give a warning and does not necessarily have to be displayed in chromatic colors.

The present invention has been devised in view of such a situation, and an object thereof is to provide: an image processing apparatus, in which a determination result of ACS is allowed to be reflected in formation of a watermark for copy control; an image forming apparatus provided with the image processing apparatus; a recording medium in which a computer program for implementing the image processing apparatus is recorded; and an image processing method.

An image processing apparatus according to the present invention is characterized by comprising: a generating section for generating watermark data associated with a chromatic or achromatic watermark for copy control, which appears as a result of making a copy; a composing section for generating composite image data associated with an image composed by joining an original image with a watermark for copy control, on a basis of the watermark data generated by the generating section and original image data obtained by reading an original document; and a determinating section for determining whether the original document includes a chromatic color or not, on a basis of the original image data, wherein the composing section generates composite image data on a basis of generated watermark data and the original image data when the determinating section determines that the original document includes a chromatic color, wherein the composing section generates composite image data on a basis of generated achromatic watermark data and the original image data when the determinating section determines that the original document does not include a chromatic color.

An image processing apparatus according to the present invention is characterized in that the generating section decides a color component of watermark data to be generated, on a basis of a determination result by the determinating section.

An image processing apparatus according to the present invention is characterized in that the generating section generates watermark data associated with an achromatic color and watermark data associated with a chromatic color, characterized by further comprising: a storage section for storing the watermark data generated by the generating section; and a selection section for selecting one from the watermark data associated with an achromatic color and the watermark data associated with a chromatic color stored in the storage section, on a basis of a determination result by the determinating section; wherein the composing section joins the original image data with the watermark data selected by the selection section.

An image processing apparatus according to the present invention is characterized by further comprising an acceptance section for accepting instructions of one of an achromatic color and a plurality of chromatic colors, wherein the generating section generates in advance achromatic watermark data and watermark data of a chromatic color accepted by the acceptance section, wherein the storage section stores the watermark data generated in advance.

An image processing apparatus according to the present invention is characterized by further comprising: a display section for displaying an image; an image display accepting section for accepting execution of display of an image composed by joining an original image with a watermark for copy control on the display section; and a producing section for creating display image data indicative of an image to be displayed on the display section, depending on the watermark data generated by the generating section, wherein the composing section joins the original image data with the display image data created by the producing section when the image display accepting section accepts execution of display, wherein the display section displays a composed image.

An image processing apparatus according to the present invention is characterized by further comprising a display section for displaying an image; and an image display accepting section for accepting execution of display of an image composed by joining an original image with a watermark for copy control on the display section, wherein the generating section corrects the watermark data depending on characteristics of the display section, wherein the composing section joins the original image data with the corrected watermark data when the image display accepting section accepts execution of display, wherein the display section displays a composed image.

An image forming apparatus according to the present invention is characterized by comprising: an image processing apparatus according to any one of the inventions described above; and an image formation for forming an image on a sheet on the basis of the original image data and the watermark data, which are processed by the image processing apparatus.

An image processing method according to the present invention is an image processing method for generating watermark data associated with a chromatic or achromatic watermark for copy control, which appears as a result of making a copy, and generating composite image data associated with an image composed by joining an original image with a watermark for copy control on the basis of the generated watermark data and original image data obtained by reading an original document, characterized by comprising steps of: determining whether the original document includes a chromatic color or not on a basis of the original image data; generating composite image data on a basis of generated watermark data and the original image data when it is determined that the original document includes a chromatic color; and generating composite image data on a basis of generated achromatic watermark data and the original image data when it is determined that the original document does not include a chromatic color.

A non-transitory computer-readable medium according to the present invention is characterized by the computer program comprising steps of: causing a computer to generate watermark data associated with a chromatic or achromatic watermark for copy control, which appears as a result of making a copy; causing a computer to generate composite image data associated with an image composed by joining an original image with a watermark for copy control, on a basis of the generated watermark data and original image data obtained by reading an original document; causing a computer to determine whether the original document includes a chromatic color or not on a basis of the original image data; causing a computer to generate composite image data on a basis of generated watermark data and the original image data when it is determined that the original document includes a chromatic color; and causing a computer to generate composite image data on a basis of generated achromatic watermark data and the original image data when it is determined that the original document does not include a chromatic color.

In the present invention, when original image data obtained by reading an original document is to be joined with watermark data associated with a watermark for copy control which appears as a result of making a copy, whether the original document includes a chromatic color or not is determined on the basis of the original image data. When it is determined that the original document includes a chromatic color, the original image data is joined with watermark data of a color specified by the user. When it is determined that the original is made up of an achromatic color, the original image data is joined with achromatic watermark data.

In the present invention, a color component (plane) to be used for adding watermark data is selected on the basis of whether the original includes a chromatic color or is made up of an achromatic color.

The present invention may have the following structure. In the present invention, whether the original document includes a chromatic color or not is determined on the basis of the original image data, chromatic watermark data and achromatic watermark data are respectively generated, and either chromatic watermark data or achromatic watermark data is selected on the basis of a determination result of whether the original document includes a chromatic color or not.

The present invention may have the following structure. Watermarks for copy control are created in advance respectively in a plurality of colors which can be generated (e.g., cyan and magenta to be used for electrophotography, and all colors which can be generated from red, green, blue, orange and the like to be used for inkjet printing) and any one watermark is selected. When the color of the watermark is to be changed after the color of the watermark is specified once, the change processing is executed promptly in such a structure.

In the present invention, display image data is created in place of watermark data, and an image composed by joining the original image data with the display image data is displayed at a display section, so as to prevent generation of moire while an image composed by joining an original image with a watermark for copy control is displayed at the display section.

In the present invention, watermark data is corrected in accordance with the specifications of the display section, and an image composed by joining the original image data with the corrected watermark data is displayed at the display section, so as to prevent generation of moire while an image composed by joining an original image with a watermark for copy control is displayed at the display section.

In the present invention, when original image data obtained by reading an original document is to be joined with watermark data associated with a watermark for copy control which appears as a result of making a copy, whether the original document includes a chromatic color or not is determined on the basis of the original image data. When it is determined that the original document includes a chromatic color, the original image data is joined with watermark data. When it is determined that the original document is a document made up of an achromatic color, the original image data is joined with achromatic watermark data. Accordingly, an achromatic watermark is formed when an original document made up of an achromatic color is read, and therefore a chromatic image is formed only when a chromatic original document is read. This prevents unnecessary consumption of color materials such as toner or ink and reduces the printing costs and the charge.

The above and further objects and features will more fully be apparent from the following detailed description with accompanying drawings.

BRIEF DESCRIPTION OF THE SEVERAL VIEWS OF THE DRAWINGS

FIGS. 5A and 5B are explanatory diagrams for explaining the relation between the number of dots per unit area and the type of a watermark;

DETAILED DESCRIPTION

Figure 1:
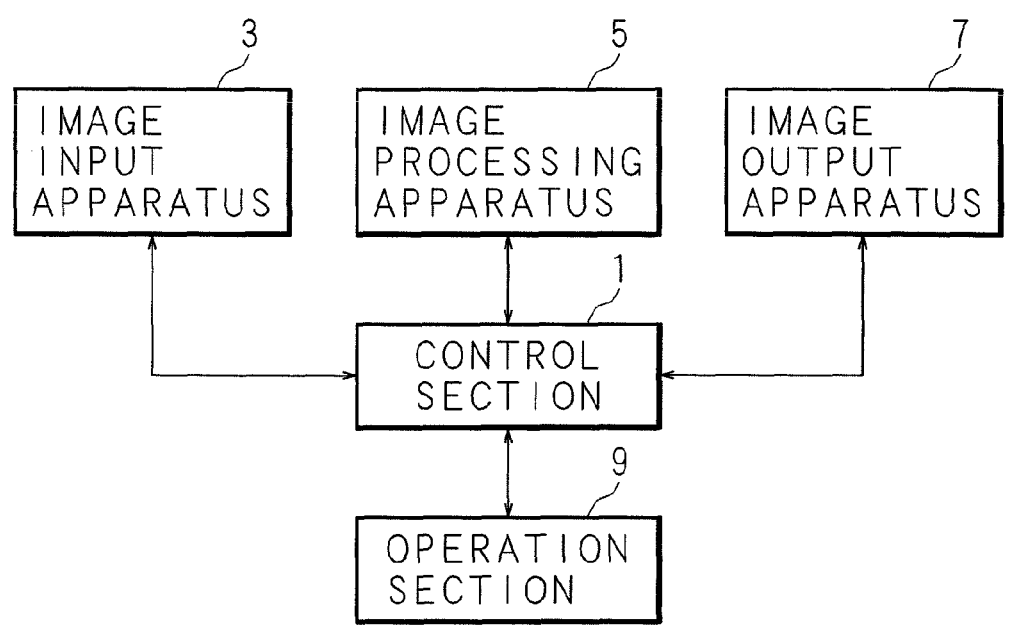
FIG. 1 is a block diagram for explaining the internal configuration of an image forming apparatus.
Figure 2:
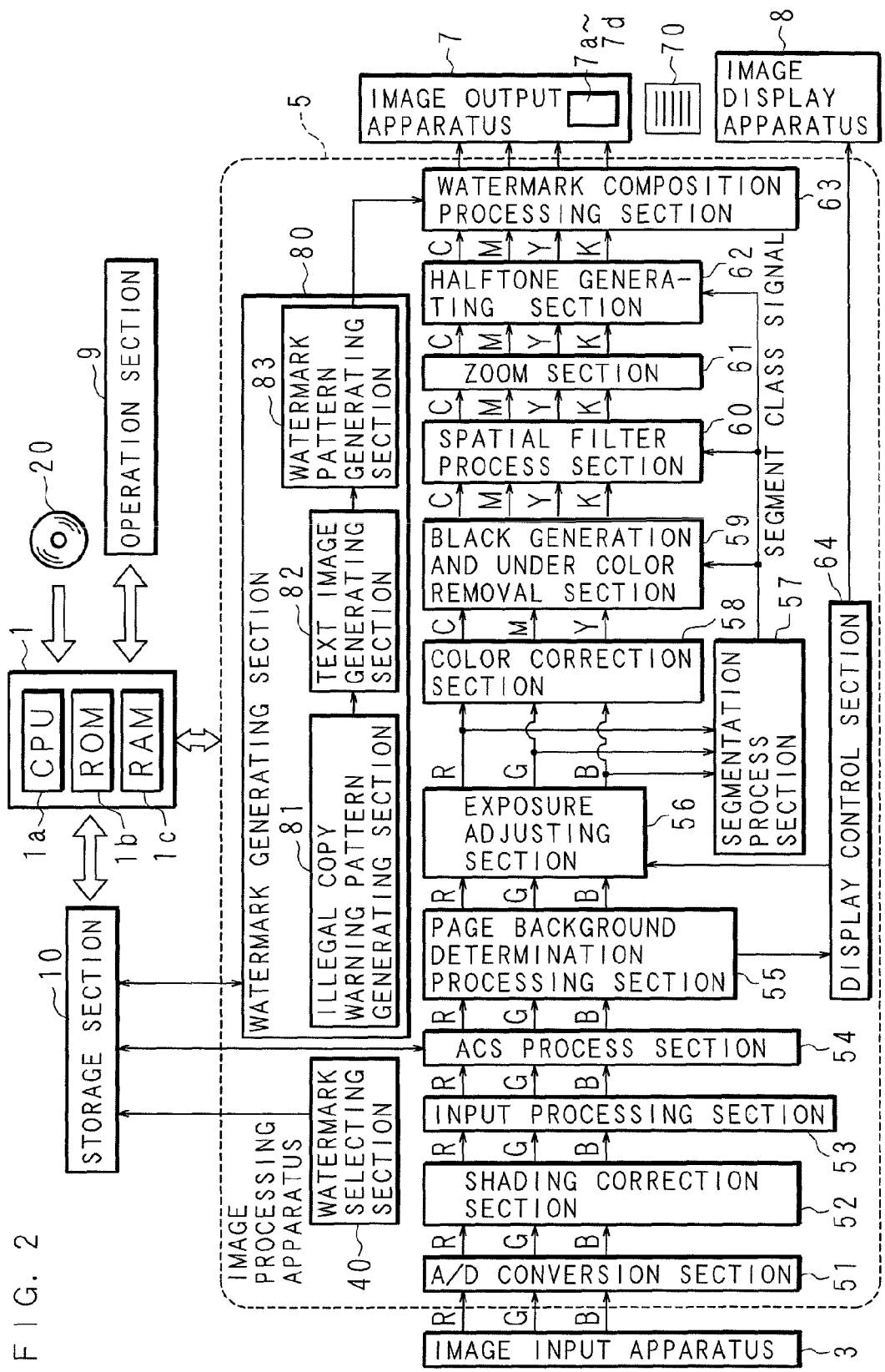
FIG. 2 is a block diagram for explaining the configuration of an image processing apparatus.

The following description will explain the present invention in detail with reference to the drawings illustrating an image forming apparatus according to an embodiment. FIG. 1 is a block diagram for explaining the internal configuration of an image forming apparatus, and FIG. 2 is a block diagram for explaining the configuration of an image processing apparatus 5.

The image forming apparatus includes with a control section 1, an image input apparatus 3, an image processing apparatus 5, an image output apparatus 7 and an operation section 9. The control section 1 is a microcomputer, which is provided with: a ROM (Read Only Memory) 1b storing a control program for controlling the respective hardware parts; a CPU (Central Processing Unit) 1a for executing the control program; a RAM (Random Access Memory) 1c for storing various kinds of data to be generated during execution of the control program; and the like. Here, the ROM 1b may have a writable structure. In such a case, the control program may be recorded in a computer-readable recording medium 20 and downloaded to the ROM 1b.

The image input apparatus 3 is means for reading an image of an original document and is provided with: a light source for emitting an original document to be read with light; an image sensor such as a CCD (Charge Coupled Device); and the like. The image input apparatus 3 focuses an image of reflected light from an original document, which is put on a predetermined reading station, on the image sensor and outputs an analog RGB (R: Red, G: Green, B: Blue) electric signal. The analog electric signal outputted from the image input apparatus 3 inputs into the image processing apparatus 5.

The image processing apparatus 5 converts the analog electric signal outputted from the image input apparatus 3 into a digital electric signal and then performs image processing depending on the type of an original image, and generates an image signal to be outputted. The generated image signal is outputted to the image output apparatus 7. The image output apparatus 7 is provided with developing means storing respective developer 7a-7d of cyan, magenta, yellow and black. The image processing apparatus 5 generates a CMYK signal (C: Cyan, M: Magenta, Y: Yellow, K: Black) as an image signal to be outputted. The internal configuration, the operation and the like of the image processing apparatus 5 will be described later in detail.

The image output apparatus 7 is means for forming an image on a sheet 70, such as paper or an OHP film, on the basis of the image signal outputted from the image processing apparatus 5. Accordingly, the image output apparatus 7 is provided with charging means, a laser scanning unit, the developing means, transferring means and the like (none is illustrated in the drawings). The charging means electrically charges a photoreceptor at a predetermined potential. The laser scanning device produces laser light in response to image data accepted from the image processing apparatus so as to generate an electrostatic latent image on the photoreceptor. The developing means supplies toner, which functions as developer 7a-7d, to the electrostatic latent image formed on the surface of the photoreceptor so as to visualize the image. The transferring means transfers a toner image formed on the surface of the photoreceptor onto paper. The image output apparatus 7 forms an image desired by the user on paper by electrophotography. Here, image formation may be achieved by inkjet printing, thermal transfer printing, dye sublimation printing or the like in place of the electrophotography using a laser writing device.

The operation section 9 is provided with various kinds of switches and buttons for accepting instructions, selection operations or the like by the user.

The image processing apparatus 5 is provided with an A/D conversion section 51, a shading correction section 52, an input processing section 53, an ACS process section 54, a page background determination processing section 55, an exposure adjusting section 56, a segmentation process section 57, a color correction section 58, a black generation and under color removal section 59, a spatial filter process section 60, a zoom section 61, a halftone generating section 62, a watermark composition processing section 63, a watermark generating section 80 and a watermark selecting section 40.

The A/D conversion section 51 converts an analog RGB signal inputted from the image input apparatus 3 into a digital signal. The shading correction section 52 performs processing of removing various kinds of distortion to be generated in an illuminating system, an image focusing system or an image sensing system of the image input apparatus 3, on the digital RGB signal outputted from the A/D conversion section 51. The shading correction section 52 also adjusts the color balance. The input processing section 53 performs image adjustment processing such as gamma correction and contrast control.

The ACS process section 54 determines whether a read-out original image (document) is a chromatic (color) image or an achromatic (monochrome) image, using the RGB signal outputted from the input processing section 53. For example, whether a pixel is a chromatic pixel or an achromatic pixel is determined for each pixel. When a group of chromatic pixels the number of which is equal to or larger than a predetermined number are detected in series in a given pixel order, the group of chromatic pixels is recognized as a chromatic block. When the number of chromatic groups existing in one line is equal to or larger than a predetermined number, the line is counted as a chromatic line. When the number of chromatic lines existing in an original is equal to or larger than a predetermined number, it is determined that the original is a chromatic original. When the number of chromatic lines existing in an original is smaller than the predetermined number, it is determined that the original is an achromatic original. Here, the number of pixels which is used as the criterion for recognizing a chromatic block, the number of chromatic blocks which is used as the criterion for recognizing a chromatic line, and the number of chromatic lines which is used as the criterion for determining that an original is a chromatic original may be set arbitrarily.

The following method is an example of a method of determining for each pixel whether the pixel is a chromatic pixel or an achromatic pixel.

(1) The difference between the maximum value and the minimum value of an RGB signal is compared with a threshold THa as expressed by the following expression. Here, the maximum value of an RGB signal is denoted by max(R, G, B), and the minimum value of an RGB signal is denoted by min(R, G, B) in the following expression.

$$\max(R,G,B) - \min(R,G,B) > THa \text{ (e.g., 20)}$$

It is determined that a pixel is a chromatic pixel when the difference between the maximum vale and the minimum value of an RGB signal exceeds THa.

(2) The absolute value of the difference of each color component of an RGB signal is calculated and compared with a threshold.

The following method may be employed as a determination method at the ACS process section 54. First, the difference between the maximum value and the minimum value of an RGB signal is compared with a threshold THa (e.g., 20), and whether a pixel is a chromatic pixel or not is determined. Then, the number of pixels in the entire original image (document), which are determined respectively to be a chromatic pixel, is counted. For example, when 7000 or more chromatic pixels exist in an original image, it is determined that the original image is a color (chromatic) original document. When chromatic pixels less than 7000 exist in an original image, it is determined that the original image is a monochrome (achromatic) original document.

Here, used as the threshold THa is not the proportion of the number of chromatic pixels to the number of pixels in the entire original image but an absolute number, since this allows the ACS process section 54 to judge an original document, which is partly colored (e.g., an original stamped with a seal) and has a size (e.g., A3) larger than a normal size (e.g., A4), as a chromatic original document.

A method of calculating the absolute value of the difference of each color component of an RGB signal or any other known determination method may be used as a determination method of a chromatic color or an achromatic color. That is, a determination method of a chromatic color or an achromatic color is not limited to the method illustrated above but may be any other method, which enables accurate determination of a chromatic color or an achromatic color. Moreover, a method of determining whether a read-out original is a chromatic (color) original or an achromatic (monochrome) original is not limited to the above method but may be implemented with any other known technique disclosed in a patent application.

The image forming apparatus is also provided with a storage section 10 having an HDD (Hard Disk Drive), a flash memory or the like. Data (determination result) outputted from the ACS process section 54 is stored in the storage section 10.

The page background determination processing section 55 determines whether a page background density exceeds a predetermined threshold or not. Specifically, the page background determination processing section 55 applies an inputted RGB signal to the following expression so as to convert the RGB signal into a luminance signal.

$$Yj = 0.30Rj + 0.59Gj + 0.11Bj$$

Here, the luminance signal of each pixel is denoted by Yj, and color component signals of each pixel are denoted by Rj, Gj and Bj.

A lightness signal may be calculated in place of a luminance signal. For example, a lightness signal may be calculated by conversion into an L*a*b* signal, or a uniform color space in other words, defined by CIE (Commission International de l'Eclairage).

Figure 3:
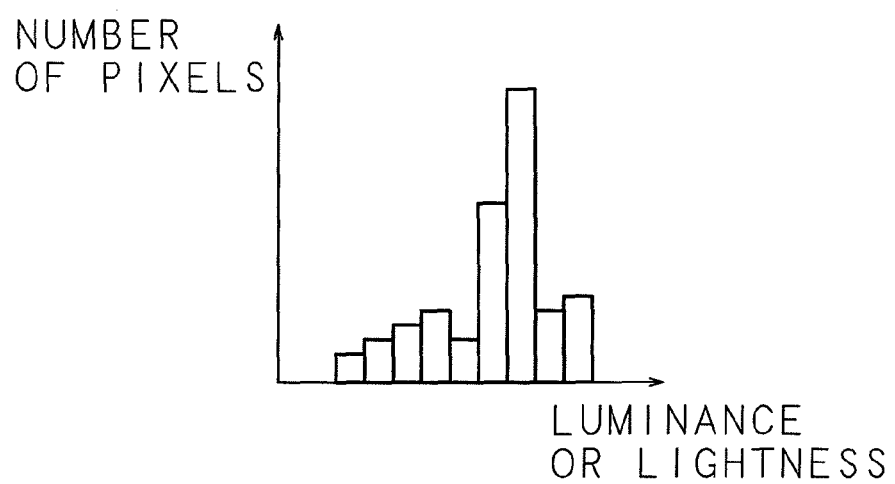
FIG. 3 is an example of a histogram showing the relation between the number of pixels and the luminance or lightness.

FIG. 3 is an example of a histogram showing the relation between the number of pixels and the luminance or lightness. As illustrated in FIG. 3, the page background determination processing section 55 creates a histogram for the entire image on the basis of the luminance signal or lightness signal described above. The page background determination processing section 55 treats a luminance or a lightness, which corresponds to the largest number of pixels (frequency, number of times) equal to or larger than a threshold th1 (the minimum value of the number of pixels, which are determined to be of page background. For example, the original size may be stored in a memory in relation to the minimum value of the number of pixels determined to be of page background, and a threshold may be set depending on the detection result of the original size.), as the luminance or lightness of a page background part and compares the luminance or lightness Yf with a preset threshold th2.

When Yf>th2 is satisfied, it is determined that the luminance of page background is higher than a threshold (page background exists). When Yf>th2 is not satisfied, it is determined that the luminance of page background is equal to or lower than a threshold (page background does not exist). Here, values which enable appropriate determination of page background depending on the original are set as the thresholds th1 and th2.

The image processing apparatus 5 is also provided with a display control section 64 for controlling the drive of an image display apparatus 8. The display control section 64 is provided with a CPU, a ROM, a RAM and the like. The image processing apparatus 5 gives an instruction from the display control section 64 to the image display apparatus 8 to display a warning for prompting the user to adjust the exposure, when addition of a watermark for copy control to an original image document is set and it is determined by the page background determination processing section 55 that the luminance or lightness exceeds a threshold.

Figure 4:
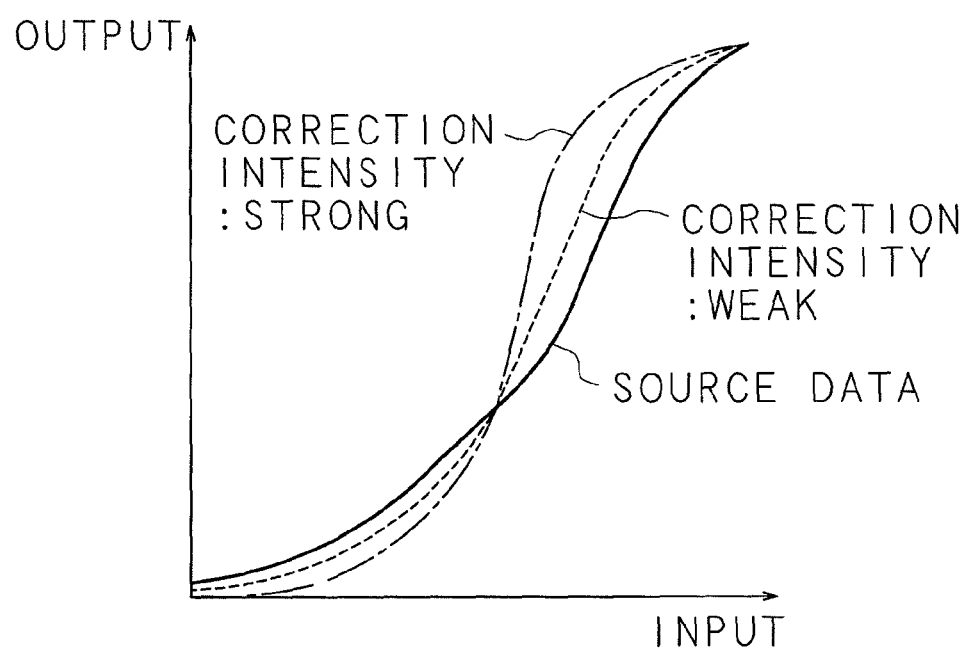
FIG. 4 is a diagram illustrating an example of an LUT for exposure correction.

FIG. 4 is a diagram illustrating an example of an LUT (Look Up Table) for exposure correction. When an instruction of adjusting exposure is inputted from the operation section 9, the exposure adjusting section 56 switches from one of a plurality of LUTs (see FIG. 4) preset in the storage section 10 to another so as to correct an RGB value of an input image and performs the processing of removing page background. The exposure adjusting section 56 then outputs data to the segmentation process section 57 and the color correction section 58. Here, the exposure adjusting section 56 outputs data to the segmentation process section 57 and the color correction section 58 without executing the processing of removing page background when an instruction of adjusting exposure is not inputted from the operation section 9.

Using an RGB signal, the segmentation process section 57 performs the processing of segmenting each pixel in an input image into any one region among a black text region, a color text region, a halftone dot region, a photograph region and the like. On the basis of the segmentation result, the segmentation process section 57 outputs a segmentation class signal indicating which region a pixel belongs to, to the black generation and under color removal section 59, the spatial filter process section 60 and the halftone generating section 62 of the following stage.

The color correction section 58 generates a CMY signal (C: Cyan, M: Magenta, Y: Yellow) which is complementary colors of an RGB signal and performs the processing of removing color impurity caused by the spectral characteristics of CMY color materials including unnecessary absorption components in order to improve the color reproducibility.

The black generation and under color removal section 59 performs black generation for generating a black (K) signal from a three color CMY signal obtained by color correction and performs the processing of generating a new CMY signal by subtracting the K signal obtained by black generation from the original CMY signal. By such processing, a three color CMY signal is converted into a four color CMYK signal.

An example of black generation processing is a method (common method) of black generation using skeleton black. When using the method, the black generation and under color removal processing is expressed by the following expression. Here, the input/output characteristics of the skeleton curve is denoted by y=f(x), inputted data are denoted by C, M and Y, outputted data are denoted by C', M', Y' and K', and the UCR (Under Color Removal) rate is denoted by $\alpha$ ($0<\alpha<1$) in the following expression.

$$K'=f\{\min(C,M,Y)\}$$

$$C'=C-\alpha K'$$

$$M'=M-\alpha K'$$

$$Y'=Y-\alpha K'$$

The spatial filter process section 60 performs spatial filter processing using a digital filter, on image data of a CMYK signal inputted from the black generation and under color removal section 59 on the basis of a segmentation class signal. The spatial filter process section 60 corrects the spatial frequency characteristics so as to perform the processing of preventing blurring or graininess degradation of an output image.

For example, the enhancement of high frequency components of a region segmented by the segmentation process section 57 into a black text or a color text is carried out by an edge enhancement process in the spatial filter processing by the spatial filter process section 60 in order to improve the reproducibility of a black text or a color text. At the same time, the halftone generating section 62 executes multi-level dithering processing on a screen having high resolution suitable for reproduction of high frequency components. Here, binarization processing may be executed in the halftone generating section 62.

The zoom section 61 executes the processing of enlargement or reduction of an image on data inputted from the spatial filter process section 60 on the basis of a zooming command (information indicative of a copy ratio of a printed image) inputted from the operation section 9. The halftone generating section 62 executes tone reproduction processing for outputting an image, on data inputted from the zoom section 61.

The watermark composition processing section 63 joins watermark data inputted from the watermark generating section 80 with halftone data inputted from the halftone generating section 62. Composition by joining the watermark data with the halftone data is performed for any one color component data (plane) among C, M and K specified in advance. The composition method will be described later in detail. The watermark generating section 80 includes an illegal copy warning pattern generating section 81, a text image generating section 82 and a watermark pattern generating section 83. The illegal copy warning pattern generating section 81 generates illegal copy warning pattern data for warning such as "Copy", "Copy Prohibited" and "Confidential" on the basis of an instruction from the operation section 9. The text image generating section 82 converts the illegal copy warning pattern data into bit map image data. The watermark pattern generating section 83 generates watermark data including information indicative of small dots and information indicative of large dots corresponding to each plane, on the basis of the bit map image data. The watermark data generated by the watermark pattern generating section 83 is stored in the storage section 10.

FIGS. 5A and 5B are explanatory diagrams for explaining the relation between the number of dots per unit area and the type of a watermark. In the image described in FIG. 5A, a dispersed large dot part, which includes a small number of dots per unit area, is arranged respectively on the left and on the right, and a clustered small dot part, which includes a large number of dots per unit area, is arranged therebetween. The area occupied with all dots per unit area is set at approximately the same area at the clustered small dot part and at the dispersed large dot part, so that both parts are recognized as approximately the same density. This makes it difficult for the user to get a view of a watermark for copy control. On the other hand, described in FIG. 5B is an image obtained by copying the watermark with a copying machine or a multi-function machine. A scanner (image input apparatus) provided in a copying machine or a multi-function machine can recognize the dispersed large dot part but cannot recognize the clustered small dot part since the area of one dot in the clustered small dot part is small. Accordingly, the clustered small dot part is not copied and does not readily appear in a copied image as illustrated in FIG. 5B. This makes it easy for the user to get a view of a watermark for copy control.

Figure 6A:
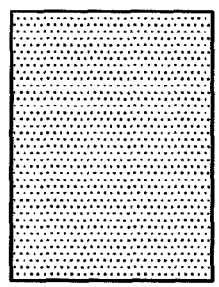
FIGS. 6A and 6B are explanatory diagrams for explaining generation of watermark data, with which a hidden illegal copy warning pattern does not readily appear as a result of making a copy.
Figure 6A:
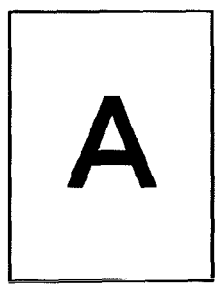
Figure 6A:
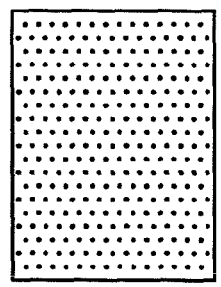
Figure 6A:
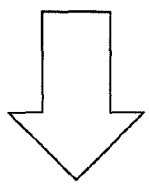
Figure 6B:
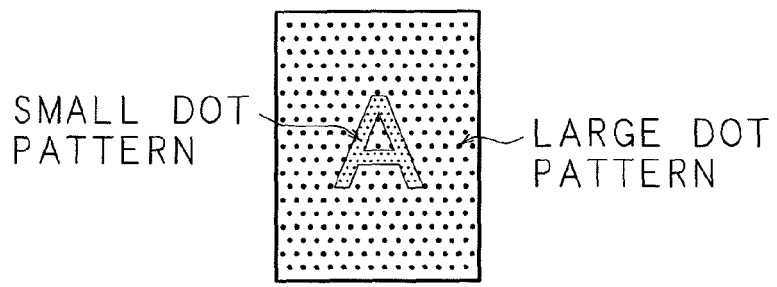

FIGS. 6A and 6B are explanatory diagrams for explaining generation of watermark data, with which a hidden illegal copy warning pattern does not readily appear as a result of making a copy. As illustrated in FIG. 6A, the watermark pattern generating section 83 compares information indicative of small dots, illegal copy warning pattern data, and information indicative of dispersed large dots one another. The watermark pattern generating section 83 relates the information indicative of small dots to an illegal copy warning pattern part in the illegal copy warning pattern data, and relates the information indicative of dispersed large dots to a non illegal copy warning pattern part in the illegal copy warning pattern data. The watermark pattern generating section 83 then generates an illegal copy warning pattern with small dots and generates background with dispersed large dots as illustrated in FIG. 6B. Here, when an illegal copy warning pattern is to appear on a copy of an original document, the watermark pattern generating section 83 relates the information indicative of dispersed large dots to an illegal copy warning pattern part and relates the information indicative of small dots to a non illegal copy warning pattern part.

The watermark selecting section 40 selects watermark data to be used depending on a determination result at the ACS process section 54. When a determination result at the ACS process section 54 indicates an achromatic color, the watermark selecting section 40 outputs achromatic watermark data stored in the storage section 10 to the watermark composition processing section 63. When a determination result at the ACS process section 54 indicates a chromatic color, the watermark selecting section 40 outputs watermark data of a color specified by the user, which is stored in the storage section 10, to the watermark composition processing section 63.

Here, the watermark data may be outputted to the watermark composition processing section 63 without passing through the watermark selecting section 40, when an achromatic color is specified as the color of a watermark for copy control, or when the ACS function is in a disabled state and a chromatic color is specified as the color of a watermark for copy control.

Moreover, the present invention may have the following structure. When the color of a watermark for copy control is specified by input from the operation section 9, watermark data associated respectively with all colors which can be specified for a watermark (e.g., cyan and magenta to be used for electrophotography, and all colors which can be generated from red, green, blue, orange and the like to be used for inkjet printing) in addition to the specified color are stored in the storage section 10. When a determination result at the ACS process section 54 indicates an achromatic color, the watermark selecting section 40 outputs achromatic watermark data stored in the storage section 10 to the watermark composition processing section 63. When a determination result at the ACS process section 54 indicates a chromatic color, the watermark selecting section 40 selects watermark data associated with the specified color from the watermark data associated with the respective colors stored in the storage section 10 and outputs the selected watermark data to the watermark composition processing section 63.

Figure 7:
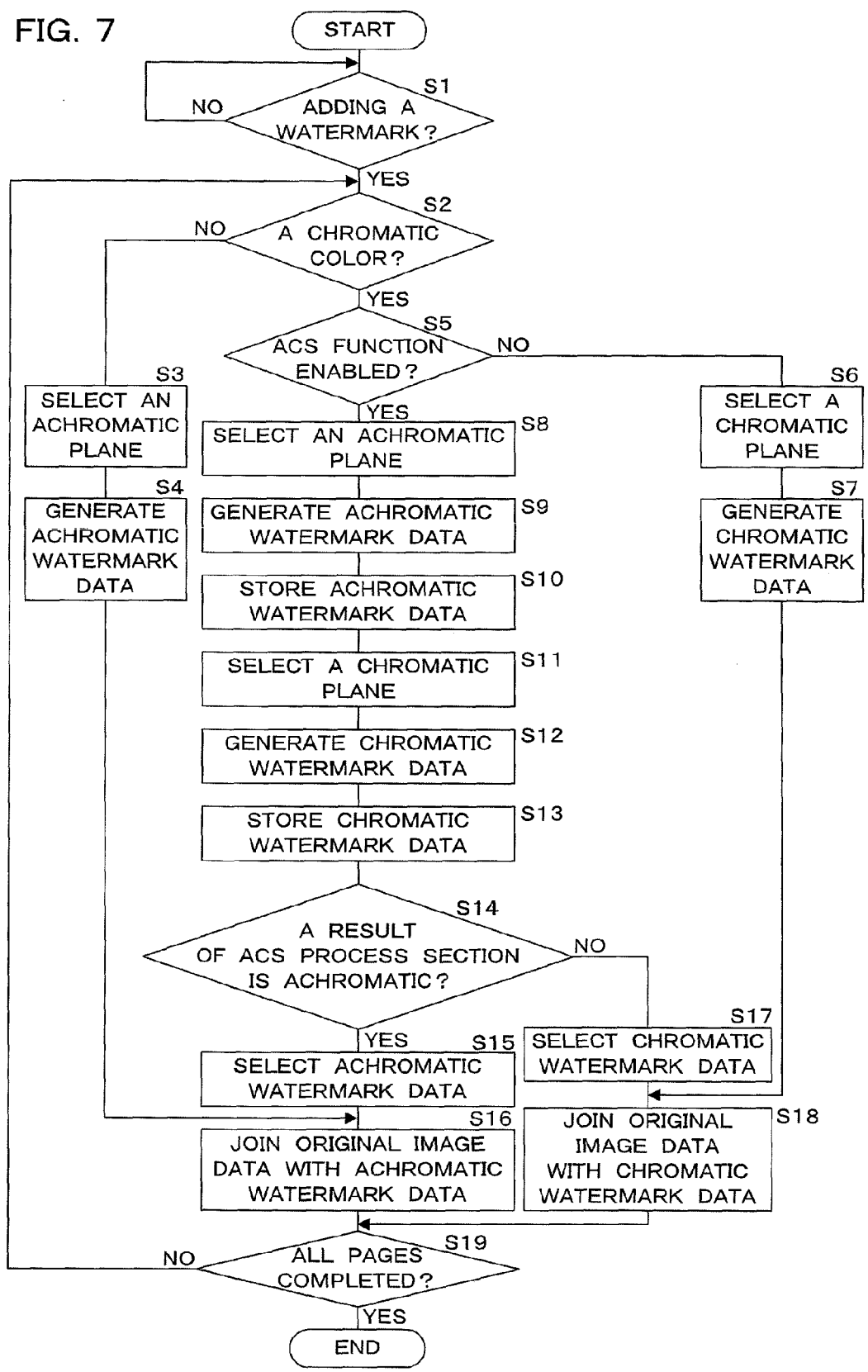
FIG. 7 is a flowchart for explaining the composition processing for a watermark and an original image by a control section.

FIG. 7 is a flowchart for explaining the composition processing for a watermark and an original image by the control section 1. Here, it is to be assumed that the control section 1 stores the total number of pages of inputted original image data in advance in the storage section 10 when a plurality of original image data is inputted. It is also to be assumed that the composition processing for a watermark and an original image is executed for each page.

The control section 1 waits until an instruction of adding a watermark is inputted from the operation section 9 (step S1: NO). When an instruction of adding a watermark is inputted from the operation section 9 (step S1: YES), the control section 1 determines whether a chromatic color is specified as the color of a watermark to be added or not (step S2). When a chromatic color is not specified as the color of a watermark to be added (step S2: NO), that is, when an achromatic color is specified as the color of a watermark to be added, the control section 1 selects an achromatic (black: K) plane at the watermark pattern generating section 83 (step S3) and generates achromatic watermark data (step S4). Here, the watermark pattern generating section 83 generates achromatic watermark data for both of an illegal print warning pattern part and a non illegal print warning pattern part so that both parts have approximately the same visual density. Accordingly, a watermark for copy control is allowed to be recognized as background and the readability of the original can be improved. The process is then advanced to a step S16, which will be described later.

When a chromatic color is specified as the color of a watermark to be added (step S2: YES), for example, when C is specified, the control section 1 determines whether the ACS function is in an enabled state or not (step S5). Here, whether the ACS function is to be enabled or disabled is decided by operating the operation section 9. When the ACS function is not in an enabled state (step S5: NO), that is, when the ACS function is in a disabled state, the control section 1 selects a chromatic (e.g., C) plane at the watermark pattern generating section 83 (step S6) and generates chromatic watermark data (step S7). Here, the watermark pattern generating section 83 generates chromatic watermark data for both of an illegal copy warning pattern part and a non illegal copy warning pattern part so that both parts have approximately the same visual density. Accordingly, a watermark for copy control is allowed to be recognized as background and the readability of the original can be improved. The process is then advanced to a step S18, which will be described later.

When the ACS function is in an enabled state (step S5: YES), the control section 1 selects an achromatic (black: K) plane at the watermark pattern generating section 83 (step S8) and generates achromatic watermark data (step S9). Here, the watermark pattern generating section 83 generates achromatic watermark data for both of an illegal copy warning pattern part and a non illegal copy warning pattern part so that both parts have approximately the same visual density. Accordingly, a watermark for copy control is allowed to be recognized as background and the readability of the original can be improved. The control section 1 then stores the generated achromatic watermark data in the storage section 10 (step S10).

Next, the control section 1 selects a chromatic (e.g., C) plane, which is specified at the step S2, at the watermark pattern generating section 83 (step S11) and generates chromatic watermark data (step S12). Here, the watermark pattern generating section 83 generates chromatic watermark data for both of an illegal copy warning pattern part and a non illegal copy warning pattern part so that both parts have approximately the same visual density. Accordingly, a watermark for copy control is allowed to be recognized as background and the readability of the original can be improved. The control section 1 then stores the generated chromatic watermark data in the storage section 10 (step S13).

Next, the control section 1 determines whether inputted original image data is achromatic data or not at the ACS process section 54 (step S14). When the inputted original image data is achromatic data (step S14: YES), the control section 1 selects achromatic watermark data at the watermark selecting section 40 (step S15) and outputs achromatic watermark data stored in the storage section 10 to the watermark composition processing section 63. The control section 1 then joins the original image data with the achromatic watermark data at the watermark composition processing section 63 (step S16). In other words, composite image data associated with an image composed by joining an original image with an achromatic watermark is generated on the basis of the original image data and the achromatic watermark data. The control section 1 joins original image data with achromatic watermark data when it is determined in the ACS determination at the step S14 that the original image is an achromatic image, even if a chromatic color is specified as the color of a watermark to be added. Data obtained by composition is outputted to the image output apparatus 7.

The determination processing at the ACS process section 54 and the generation processing at the watermark pattern generating section 83 may be executed in parallel, though the above description explains an example wherein achromatic watermark data and chromatic watermark data are generated and stored in the storage section 10 and then whether original image data inputted to the ACS process section 54 is achromatic data or not is determined.

The control section 1 then counts one page and determines whether the cumulative number of pages is equal to or larger than the total number of pages stored in the storage section 10 or not. That is, whether composition by joining original image data with watermark data for all pages has been achieved or not is determined (step S19). When the cumulative number of pages is smaller than the total number of pages stored in the storage section 10, that is, when composition by joining original image data with watermark data for all pages has not been achieved (step S19: NO), the process is returned to the step S2. When the cumulative number of pages is equal to or larger than the total number of pages stored in the storage section 10, that is, when composition by joining original image data with watermark data for all pages has been achieved (step S19: YES), the composition processing is terminated.

When it is determined at the step S14 that the inputted original image data is not achromatic data (step S14: NO), that is, when the inputted original image data is chromatic data, the control section 1 selects chromatic watermark data at the watermark selecting section 40 (step S17) and outputs chromatic watermark data stored in the storage section 10 to the watermark composition processing section 63. The control section 1 then joins the original image data with the chromatic watermark data at the watermark composition processing section 63 (step S18). In other words, composite image data associated with an image composed by joining an original image with a chromatic watermark is generated on the basis of the original image data and the chromatic watermark data. Data obtained by composition is outputted to the image output apparatus 7. The control section 1 then advances the process to a step S19.

Here, though the above composition processing is executed per one page, the execution unit is not limited to one page and any other unit such as pixels, lines or a plurality of pages may be employed as the execution unit. Moreover, a plane to be used for generating watermark data may be selected on the basis of a determination result at the ACS process section 54 without storing achromatic watermark data and chromatic watermark data in the storage section 10, though the above image processing apparatus 5 generates achromatic watermark data and chromatic watermark data, stores the generated data in the storage section 10 (steps S9, S10, S12 and S13) and selects watermark data on the basis of a determination result at the ACS process section 54 (steps S15 and S17). That is, the watermark pattern generating section 83 may be constructed to select an achromatic plane to generate watermark data when the inputted original image data is achromatic data and to select a plane of a color (chromatic color or achromatic color) specified by the user to generate watermark data when the inputted original image data is chromatic data. In such a case, selection of a plane of a watermark is performed by the control section 1, so that the processing at the watermark selecting section 40 is made redundant and the processing speed can be improved.

The image processing apparatus 5 may be constructed to store achromatic watermark data, which is generated at the step S4 when a chromatic text is not specified as the color of a watermark to be added (step S2: NO), and chromatic watermark data, which is generated at the step S7 when the ACS function is not in an enabled state (step S5: NO), in the storage section 10 and then output the generated achromatic and chromatic watermark image data from the storage section 10 to the watermark composition processing section 63, though the above description explains an example wherein the generated achromatic and chromatic watermark data are not stored in the storage section 10 but are directly outputted from the watermark generating section 80 to the watermark composition processing section 63.

Moreover, the image processing apparatus 5 may be constructed to store watermark data associated respectively with all colors which can be specified for a watermark (e.g., cyan and magenta to be used for electrophotography, and all colors which can be generated from red, green, blue, orange and the like to be used for inkjet printing) in the storage section 10, though the above image processing apparatus 5 stores achromatic watermark data in the storage section 10 at the step S10 and stores chromatic watermark data in the storage section 10 at the step S13. In such a case, the watermark selecting section 40 can promptly cope when specification of the color of a watermark is to be changed.

Next, displaying of a preview of an image composed by joining an original image with a watermark for copy control will be explained.

Figure 8:
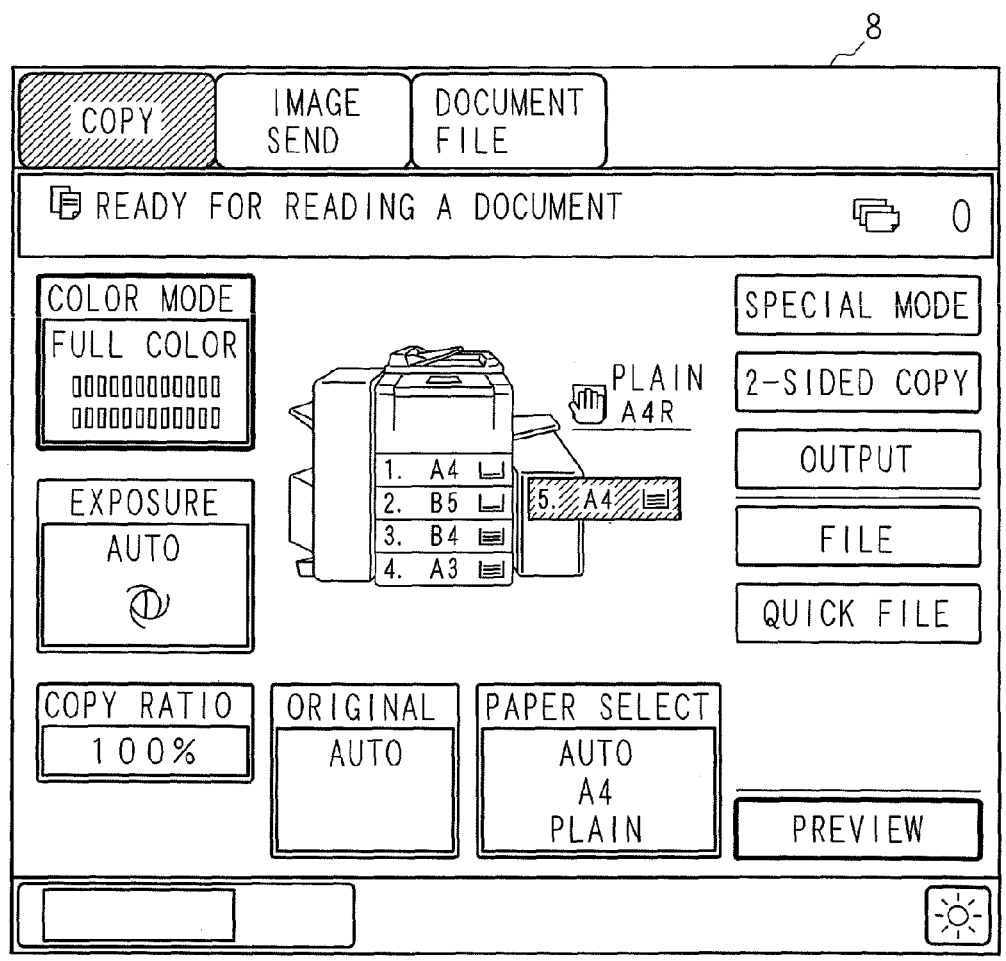
FIG. 8 is a diagram illustrating an example of an initial screen to be displayed at an image display apparatus.
Figure 9:
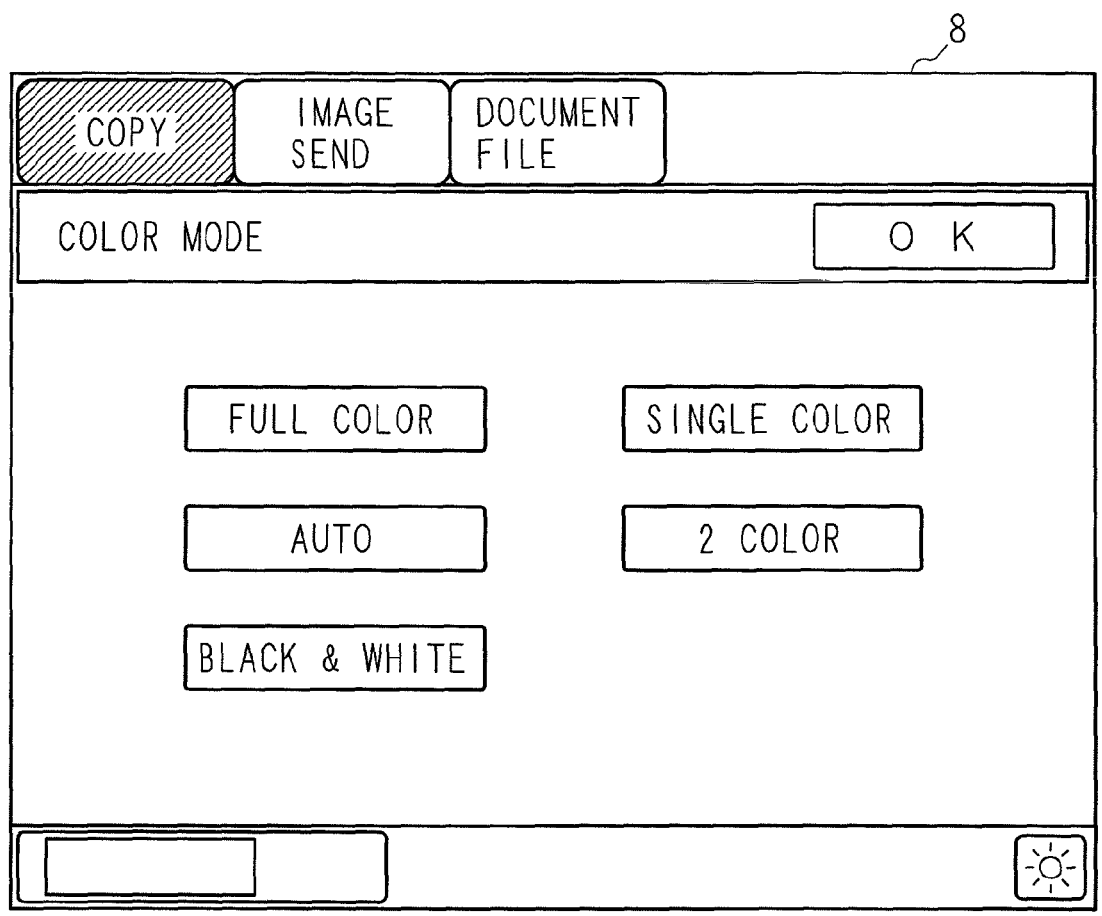
FIG. 9 is a diagram illustrating an example of a color mode selection screen to be displayed at an image display apparatus.
Figure 10:
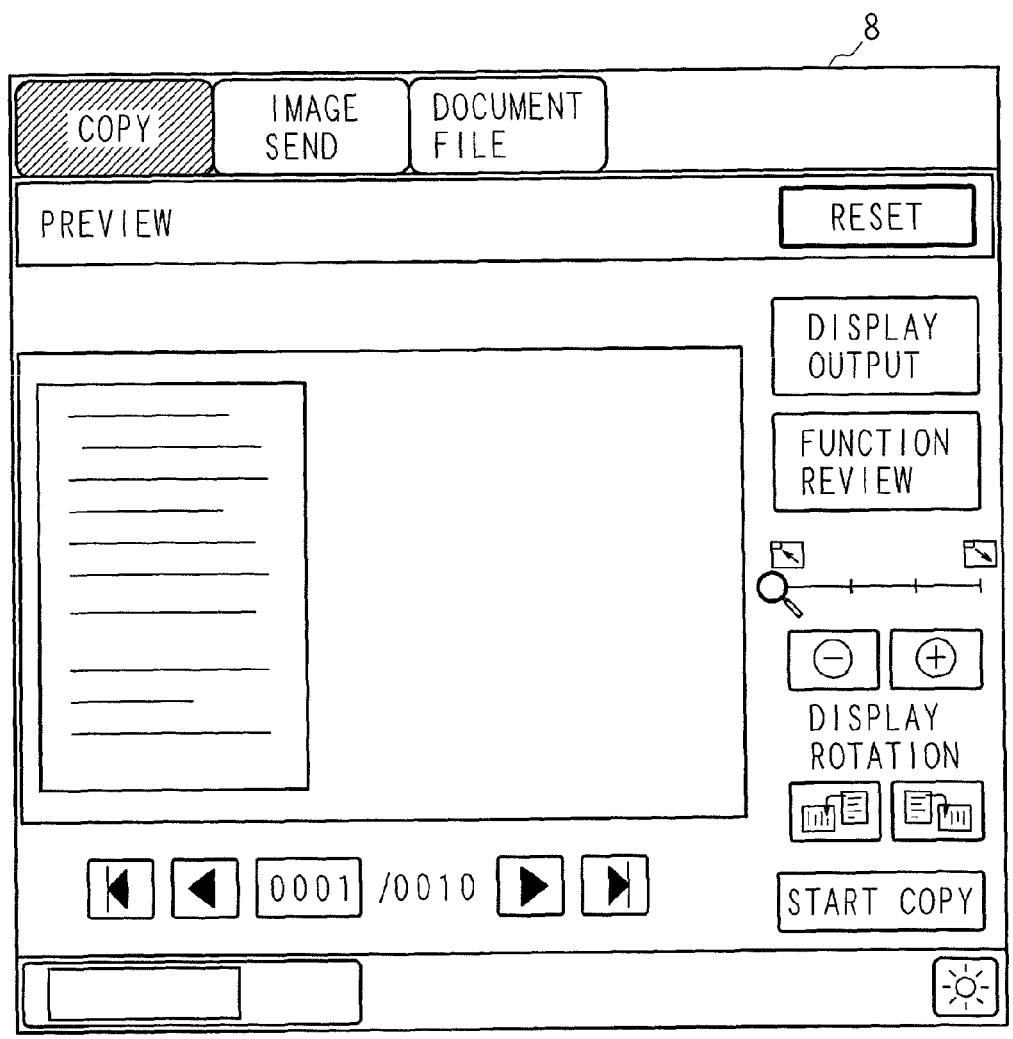
FIG. 10 is a diagram illustrating an example of a screen at an image display apparatus for displaying a preview of an image composed by joining an original image with a watermark.
Figure 11:
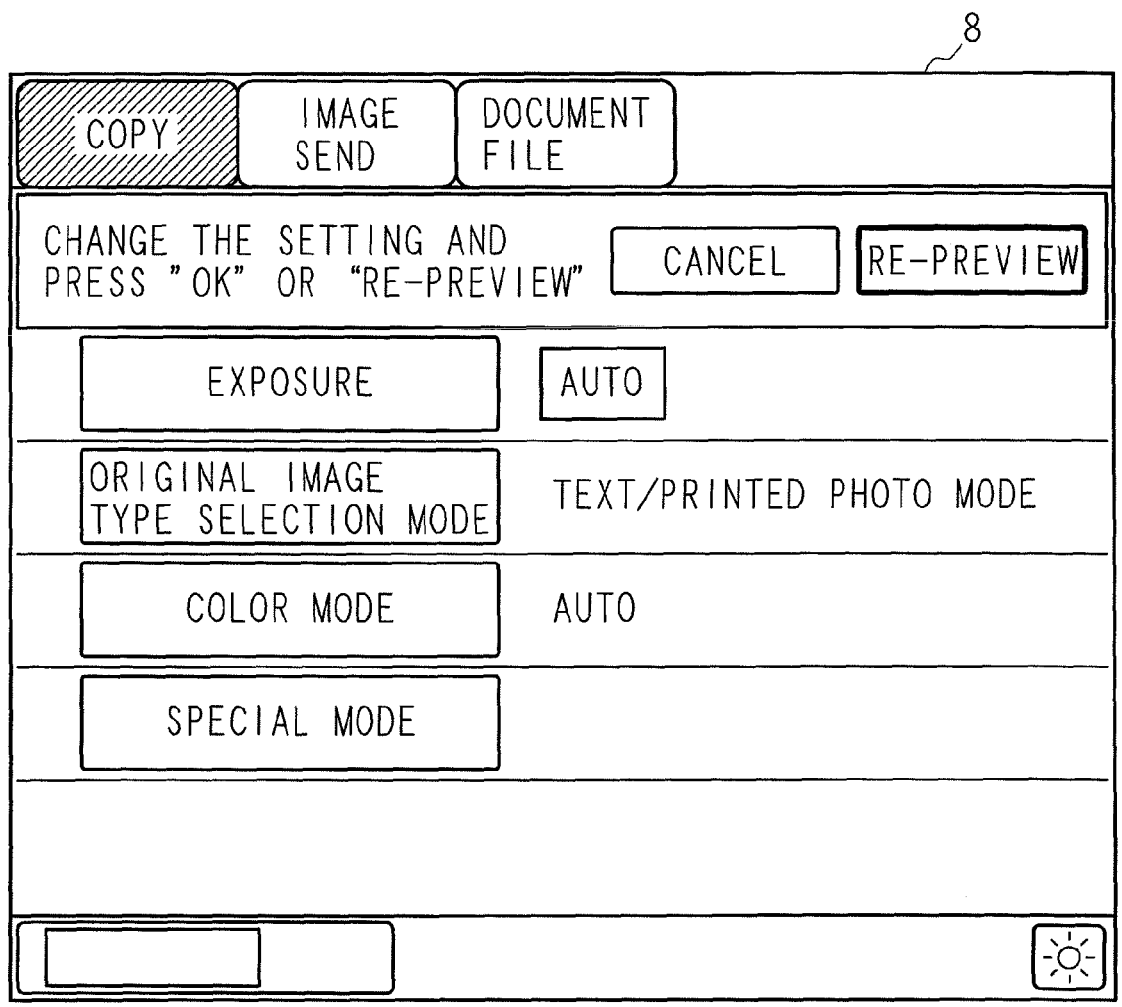
FIG. 11 is a diagram illustrating an example of a screen at an image display apparatus for resetting an image to be formed.

FIG. 8 is a diagram illustrating an example of an initial screen to be displayed at the image display apparatus 8, FIG. 9 is a diagram illustrating an example of a color mode selection screen to be displayed at the image display apparatus 8, FIG. 10 is a diagram illustrating an example of a screen at the image display apparatus 8 for displaying a preview of an image composed by joining an original image with a watermark, and FIG. 11 is a diagram illustrating an example of a screen at the image display apparatus 8 for resetting an image to be formed.

The image display apparatus 8 is provided with a display section of a touch panel type. The image display apparatus 8 can display a preview of an image composed by joining an original image with a watermark and reset an image to be formed, by operating the interface of a screen displayed at the display section.

Various kinds of settings of an image to be formed are executed by operating an initial screen. As illustrated in FIG. 8, a "Copy" button, an "Image Send" button and a "Document File" button are aligned transversally at an upper part of an initial screen. The user uses the "Copy" button to configure settings for copying and uses the "Image Send" button to configure settings for facsimile transmission. The user uses the "Document File" button to configure settings for document computerization and the like. Illustrated in FIG. 8 is a screen to be displayed when the "Copy" button is pressed, that is, a screen to be used for configuring settings for copying.

On a screen to be used for configuring settings for copying, a message "Ready for copy reading." is displayed below the "Copy" button. A "Color Mode" button, an "Exposure" button, a "Copy Ratio" button, an "Original" button, a "Paper Select" button, a "Preview" button, a "Quick File" button, a "File" button, an "Output" button, a "2-Sided Copy" button and a "Special Mode" button are arranged below the message.

The user uses the "Color Mode" button to set the color of an image to be formed and uses the "Exposure" button to set the density of an image to be formed. The user uses the "Copy Ratio" button to set the copy ratio of an image to be formed to the original and uses the "Original" button to set the size of the original. The user uses the "Paper Select" button to set the dimension of paper on which an image is to be formed and uses the "Preview" button to display a preview of an image to be formed. The user uses the "Quick File" button to store image data temporarily and uses the "File" button to computerize and store image data. The user uses the "Output" button to fine-tune an image and uses the "2-Sided Copy" button to form images on both sides of paper. The user uses the "Special Mode" button to configure settings for addition of a watermark for copy control and various kinds of other functions.

When the "Color Mode" button is pressed, a screen is displayed at the display section as illustrated in FIG. 9. A "Single Color" button, a "2 Color" button, a "Full Color" button, an "Auto" button and a "Black & White" button are arranged on the screen. The user uses the "Single Color" button to give an instruction of forming an image in one chromatic color and uses the "2 Color" button to give an instruction of forming an image in two chromatic colors. The user uses the "Full Color" button to give an instruction of forming an image in three or more chromatic colors. The user uses the "Auto" button to give an instruction of determining automatically whether the original is a color image or a monochrome image and forming an image. The user uses the "Black & White" button to give an instruction of forming an image in an achromatic color. When any one of the above buttons is pressed, an image is formed in a color or colors corresponding to the pressed button.

When the "Special Mode" button is pressed, it becomes possible to configure settings for adding a watermark for copy control, and various kinds of settings are configured, including: (1) the type of a watermark (a watermark with which a hidden illegal copy warning pattern will appear on a copy of an original document or a watermark with which a hidden illegal copy warning pattern will not readily appear on a copy of an original document), (2) the color of a watermark (e.g., cyan, magenta or black), (3) an illegal copy warning pattern to be added (see the illegal copy warning pattern in FIG. 13 which will be described later), (4) the density of a watermark, and (5) the camouflage pattern.

When the "Preview" button (see FIG. 8) in an initial screen is pressed, a preview of an image to be formed is displayed at the central part of the screen as illustrated in FIG. 10. A "Reset" button to be used for resetting conditions such as the density and the color of an image to be formed is located at an upper right part of the screen. When the "Reset" button is pressed, a screen is displayed as illustrated in FIG. 11. On the screen, an "Exposure" button, an "Original Image Type Selection Mode" button, a "Color Mode" button and a "Special Mode" button are arranged in tandem. The user uses the "Exposure" button to set the density of an original image and uses the "Original Image Type Selection Mode" button to set the type of an original image such as a text or a photograph. The user uses the "Color Mode" button to set the color of an original image and uses the "Special Mode" button to change other conditions such as the type, the color, the text and the density of a watermark. A "Re-Preview" button is located at an upper right part of the screen.

The user operates the "Exposure" button, the "Original Image Type Selection Mode" button, the "Color Mode" button and the "Special Mode" button to change the settings, so as to configure intended settings for an original image and a watermark. The user can give an instruction of displaying a preview of an image obtained by changing the settings, by pressing the "Re-Preview" button.

The operation section 9 is provided with a "Start Copy" button. Various kinds of settings are configured by operating the above-described buttons displayed on the screen, and an image reflecting various kinds of settings is formed on the sheet 70 when the "Start Copy" button is pressed.

Figure 12:
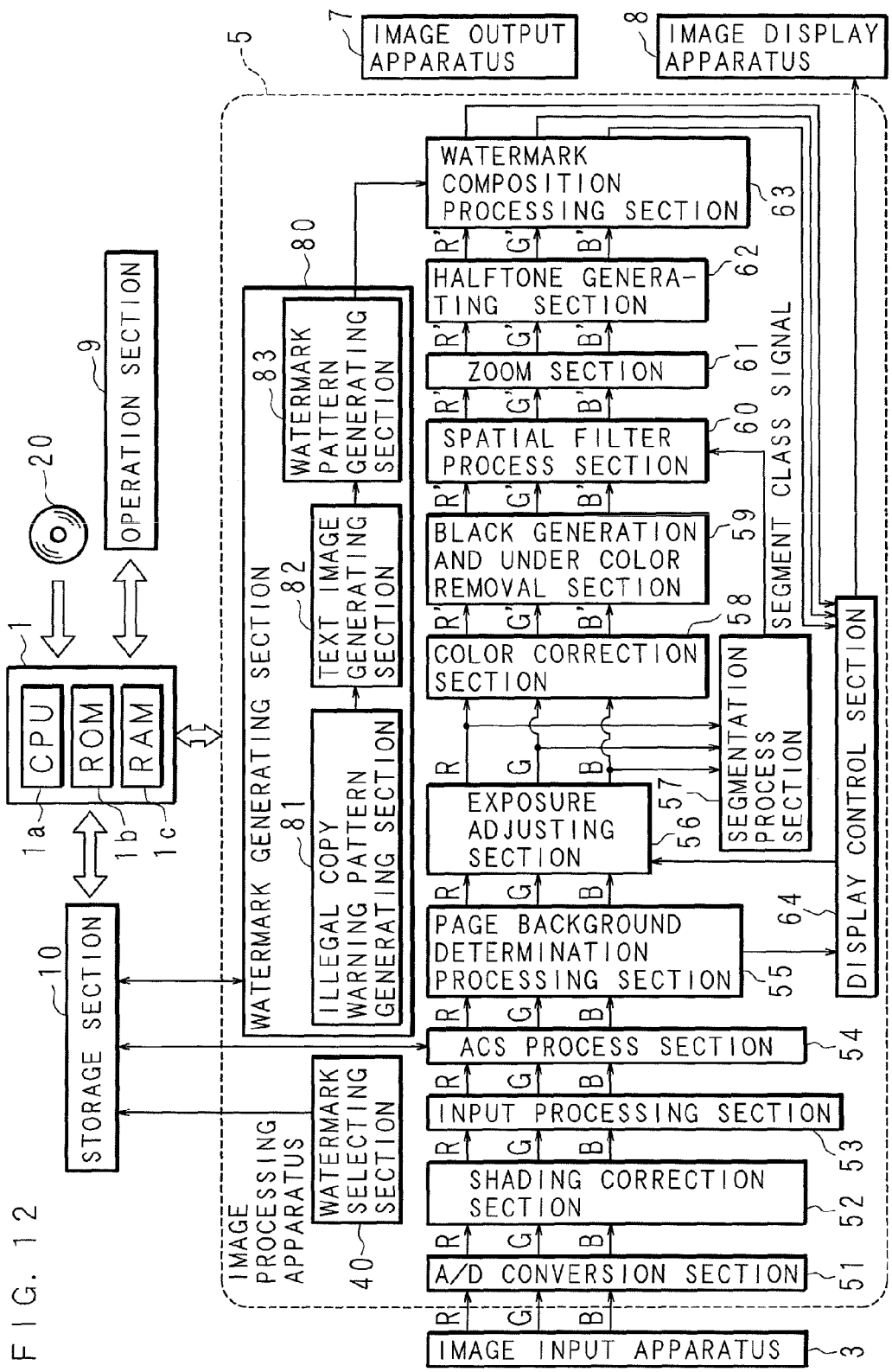
FIG. 12 is a block diagram for explaining the processing of an image processing apparatus involved in displaying of a preview.

FIG. 12 is a block diagram for explaining the processing of an image processing apparatus involved in displaying of a preview.

The processes by the A/D conversion section 51 to the segmentation process section 57 illustrated in FIG. 12 are the same as the processes associated with the image formation described above, and detailed explanation thereof is omitted. The color correction section 58 converts RGB data (original image data) adapted to the color space of the image input apparatus 3 (e.g., a scanner) into R'G'B' image data (e.g., an sRGB (standard RGB) signal) adapted to the color space of the image display apparatus 8.

The black generation and under color removal section 59 outputs data inputted from the color correction section 58 to the spatial filter process section 60 without executing any processing.

The spatial filter process section 60 executes the spatial filter processing (e.g., highlighting and smoothing) using a digital filter on the basis of a segmentation class signal inputted from the segmentation process section 57 and outputs data to the zoom section 61.

The zoom section 61 executes downsampling for omitting a part of image data read by the image input apparatus 3 so as to match the resolution (e.g., 600 dpi or 1200 dpi) of image data read by the image input apparatus 3 with the resolution (e.g., 72 dpi) of a screen of the image display apparatus 8. Downsampling is executed since the resolution of the image display apparatus 8 is generally lower than the resolution of the image input apparatus 3.

The halftone generating section 62 outputs data inputted from the zoom section 61 to the watermark composition processing section 63 without executing any processing.

The watermark composition processing section 63 joins the R'G'B' image data (original image data) obtained by downsampling with watermark data inputted from the watermark pattern generating section 83 and outputs composite data to the display control section 64. The display control section 64 executes gamma correction processing on the basis of the display characteristics of the image display apparatus 8 and outputs data to the image display apparatus 8. A preview image is displayed at the image display apparatus 8.

The segmentation processing and the spatial filter processing may be omitted when the resolution of a preview image is low, though the segmentation processing is executed at the segmentation process section 57 and the spatial filter processing is executed at the spatial filter process section 60 in the processes described above.

Next, the processing of the watermark composition processing section 63 involved in displaying of a preview will be described in detail.

The watermark composition processing section 63 converts a CMYK signal associated with watermark data into an RGB signal and executes composition by joining original image data with watermark data, since a preview image is an RGB signal. Conversion of a CMYK signal associated with watermark data into an RGB signal is performed with reference to an LUT stored in the storage section 10 in advance.

When original image data is to be joined with watermark data, the watermark composition processing section 63 uses dummy image data (dummy data) covered with a predetermined color or watermark data, for which downsampling is not performed, as watermark data, depending on the color component data (plane) of a watermark. Here, the dummy data corresponds to watermark data and is equivalent to display image data indicative of an image to be displayed at the display section.

When the watermark composition processing section 63 is to use dummy data, the watermark generating section 80 generates the dummy data in advance and stores the dummy data in the storage section 10. The watermark selecting section 40 selects dummy data corresponding to the plane at the time of displaying of a preview. The watermark composition processing section 63 uses the selected dummy data. Table 1 illustrates a table showing the relation between planes of a watermark and dummy data. Here, a cyan plane, a magenta plane and a black plane are denoted respectively by a C plane, an M plane and a K plane in Table 1.

TABLE 1

|  | R VALUE (DUMMY DATA) | G VALUE (DUMMY DATA) | B VALUE (DUMMY DATA) |
|---|---|---|---|
| C PLANE | 235 | 255 | 255 |
| M PLANE | 255 | 235 | 255 |
| K PLANE | 235 | 235 | 235 |

For example, an RGB value (235, 255, 255) is used as dummy data corresponding to the C plane. By using dummy data, the watermark composition processing section 63 is allowed to cause the image display apparatus 8 to express the quasi-color shade of the original when original image data is joined with the dummy data. Since watermark data is constituted of a cyclic pattern as described above, a cycle for downsampling and a cyclic pattern of watermark data may sometimes interfere with each other, causing generation of moire at the image display apparatus 8. However, it is possible to prevent generation of moire at the image display apparatus 8, by joining original image data with dummy data.

Figure 13:
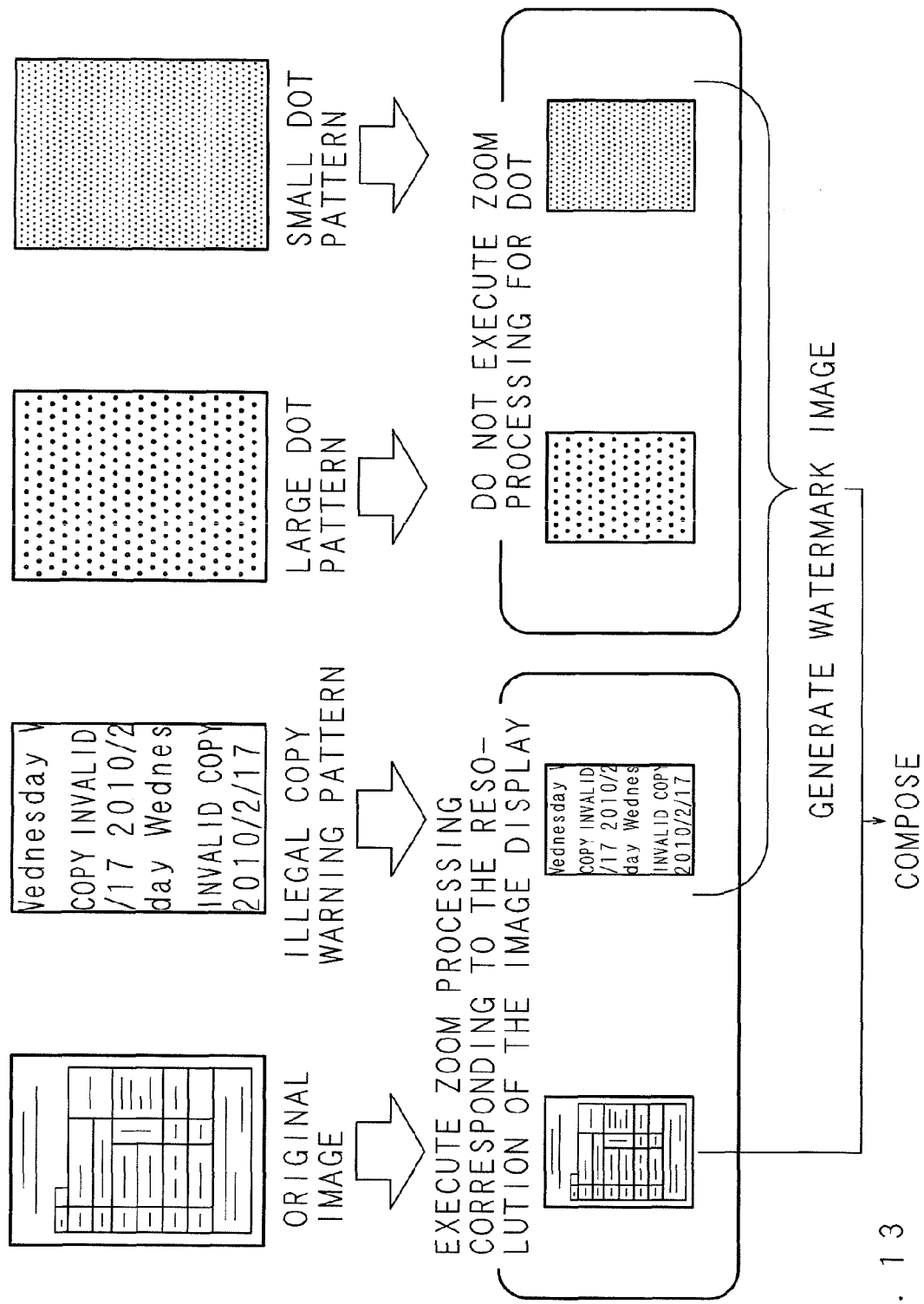
FIG. 13 is an explanatory diagram for explaining composition by joining an original image with a watermark, for which downsampling is not performed.

FIG. 13 is an explanatory diagram for explaining composition by joining an original image with a watermark, for which downsampling is not performed. When the watermark composition processing section 63 uses watermark data for which downsampling is not performed, zoom processing corresponding to the resolution of the image display apparatus 8 is executed for original image data and data of an illegal copy warning pattern associated with watermark data as illustrated in FIG. 13. The zoom processing is not executed for information indicative of large dots associated with watermark data and information indicative of small dots. Here, the zoom processing for data of an illegal copy warning pattern associated with watermark data is executed by the watermark generating section 80.

In the watermark generating section 80, watermark data is generated on the basis of data of an illegal copy warning pattern, for which zoom processing has been performed, and information indicative of large dots and information indicative of small dots, for which zoom processing is not performed. The watermark composition processing section 63 joins the generated watermark data with R'G'B' image data (original image data), for which downsampling has been performed. Here, the size of a dot associated with a watermark displayed at the image display apparatus 8 in comparison with contents such as a text or a graphic in an original image is larger than that of an image formed on the sheet 70.

In such a case where zoom processing is not executed for information indicative of large dots associated with watermark data and information indicative of small dots, interference between a cycle of a pixel of the watermark and a cycle of downsampling with each other is suppressed and generation of moire at the image display apparatus 8 is prevented. Moreover, the user can check the positional relation between the illegal copy warning pattern and the original with a preview.

The user can change the settings of an original image or a watermark by pressing the "Reset" button after displaying a preview. The user can also display a preview of an image, for which settings has been changed, by operating the "Re-Preview" button after changing the settings. When the user presses the "Start Copy" button of the operation section 9 after displaying a preview, the image output apparatus 7 forms an image corresponding to the preview displayed on the sheet 70.

The above-described processing for joining an original image with a watermark may be stored in a computer-readable recording medium 20, though the above description explains an example wherein the processing is recorded in the ROM 1b as a program to be executed by a computer. By virtue of this, the recording medium 20, in which a program code (an executable code program, an intermediate code program, a source program or the like) for implementing the above processing is recorded, is allowed to be provided in a portable manner.

Here, a program associated with the processing for joining an original image with a watermark for copy control may be recorded in a memory to be used for processing at a microcomputer, for example, in a program medium such as a ROM, or a recording medium reading device which is not illustrated in the drawings may be provided and the program may be recorded in a program medium to be inserted in the recording medium reading device. In any case, a program stored in the recording medium may be constructed to be executed by an accessing microprocessor. Moreover, in any case, a program code may be constructed to be read, downloaded to a program storage area in a microcomputer and executed. Here, it is to be assumed that a program to download is stored in a main apparatus in advance.

Here, the above program medium is a recording medium removable from the main apparatus, and may be a medium, which carries a program code in a fixed manner, including: a tape device such as a magnetic tape or a cassette tape; a disk device such as a magnetic disk (including a flexible disk and a hard disk) or an optical disk (including a CD (Compact Disk)—ROM, an MO (Magneto-Optical disk), an MD (Mini Disc) and a DVD (Digital Versatile Disc); a card device such as an IC (Integrated Circuit) card (including a memory card) or an optical card; or a semiconductor memory such as a mask ROM, an EPROM (Erasable Programmable Read Only Memory), an EEPROM (Electrically Erasable Programmable Read Only Memory) or a flash ROM.

Moreover, the image forming apparatus may be constructed to be connected with a communication network including the Internet, and the above program medium may be a medium which carries a program code in a dynamical manner so that a program code is allowed to be downloaded from the communication network. Here, when a program is to be downloaded from the communication network as described above, the program to be downloaded may be stored in advance in a main apparatus or alternatively installed from another recording medium. Here, the present invention is also allowed to be implemented in the form of a computer data signal embedded in a carrier signal, in which the above program code is implemented with electronic transmission. The above recording medium is read by a program reader provided in a computer system or a digital color image forming apparatus, so that the image processing method described above is executed.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
   a generating section for generating watermark data associated with a chromatic or achromatic watermark for copy control, which appears as a result of making a copy;
   a composing section for generating composite image data associated with an image composed by joining an original image with a watermark for copy control, on a basis of the watermark data generated by the generating section and original image data obtained by reading an original document; and
   a determinating section for determining whether the original document includes a chromatic color or not, on a basis of the original image data,
   wherein the composing section generates composite image data on a basis of generated watermark data and the original image data when the determinating section determines that the original document includes a chromatic color,
   wherein the composing section generates composite image data on a basis of generated achromatic watermark data and the original image data when the determinating section determines that the original document does not include a chromatic color,
   wherein the generating section generates watermark data associated with an achromatic color and watermark data associated with a chromatic color,
   the image processing apparatus further comprising:
   a storage section for storing the watermark data generated by the generating section; and a selection section for selecting one from the watermark data associated with an achromatic color and the watermark data associated with a chromatic color stored in the storage section, on a basis of a determination result by the determinating section;
   wherein the composing section joins the original image data with the watermark data selected by the selection section.

2. The image processing apparatus according to claim 1, wherein the generating section decides a color component of watermark data to be generated, on a basis of a determination result by the determinating section.

3. The image processing apparatus according to claim 1, further comprising an acceptance section for accepting instructions of one of an achromatic color and a plurality of chromatic colors,
   wherein the generating section generates in advance achromatic watermark data and watermark data of a chromatic color accepted by the acceptance section,
   wherein the storage section stores the watermark data generated in advance.

4. The image processing apparatus according to claim 1, further comprising:
   a display section for displaying an image;
   an image display accepting section for accepting execution of display of an image composed by joining an original image with a watermark for copy control on the display section; and
   a producing section for creating display image data indicative of an image to be displayed on the display section, depending on the watermark data generated by the generating section,
   wherein the composing section joins the original image data with the display image data created by the producing section when the image display accepting section accepts execution of display,
   wherein the display section displays a composed image.

5. The image processing apparatus according to claim 1, further comprising
   a display section for displaying an image; and
   an image display accepting section for accepting execution of display of an image composed by joining an original image with a watermark for copy control on the display section,
   wherein the generating section corrects the watermark data depending on characteristics of the display section,
   wherein the composing section joins the original image data with the corrected watermark data when the image display accepting section accepts execution of display,
   wherein the display section displays a composed image.

6. An image forming apparatus comprising:
   an image processing apparatus according to claim 1; and
   an image formation section for forming an image on a sheet on a basis of the original image data and the watermark data, which are processed by the image processing apparatus.

7. An image processing method, comprising steps of:
   generating watermark data associated with a chromatic or achromatic watermark for copy control, which appears as a result of making a copy;

generating composite image data associated with an image composed by joining an original image with a watermark for copy control, on a basis of the generated watermark data and original image data obtained by reading an original document;

determining whether the original document includes a chromatic color or not on a basis of the original image data;

generating composite image data on a basis of generated watermark data and the original image data when it is determined that the original document includes a chromatic color; and generating composite image data on a basis of generated achromatic watermark data and the original image data when it is determined that the original document does not include a chromatic color, wherein the watermark generating step generates watermark data associated with an achromatic color and watermark data associated with a chromatic color, the image processing method further comprising step of:

storing the watermark data generated in the watermark data generating step; and selecting one from the stored watermark data associated with an achromatic color and the stored watermark data associated with a chromatic color, on a basis of a determination result by the determinating step;

wherein the composite image data generating step joins the original image data with the watermark data selected by the selecting step.

8. A non-transitory computer-readable medium, in which a computer program is recorded, the computer program comprising steps of:

causing a computer to generate watermark data associated with a chromatic or achromatic watermark for copy control, which appears as a result of making a copy;

causing a computer to generate composite image data associated with an image composed by joining an original image with a watermark for copy control, on a basis of the generated watermark data and original image data obtained by reading an original document;

causing a computer to determine whether the original document includes a chromatic color or not on a basis of the original image data;

causing a computer to generate composite image data on a basis of generated watermark data and the original image data when it is determined that the original document includes a chromatic color; and causing a computer to generate composite image data on a basis of generated achromatic watermark data and the original image data when it is determined that the original document does not include a chromatic color, wherein the watermark generating step generates watermark data associated with an achromatic color and watermark data associated with a chromatic color, the computer program further comprises step of:

causing a computer to store the watermark data generated in the watermark data generating step; and causing a computer to select one from the stored watermark data associated with an acromatic color and the stored watermark data associated with a chromatic color, on a basis of a determination result by the determinating step;

wherein the composite image data generating step joins the original image data with the watermark data selected by the selected step.

9. An image processing apparatus comprising:

a generating section for generating watermark data associated with a chromatic or achromatic watermark for copy control, which appears as a result of making a copy;

a composing section for generating composite image data associated with an image composed by joining an original image with a watermark for copy control, on a basis of the watermark data generated by the generating section and original image data obtained by reading an original document; and a determinating section for determining whether the original document includes a chromatic color or not, on a basis of the original image data, wherein the composing section generates composite image data on a basis of generated watermark data and the original image data when the determinating section determines that the original document includes a chromatic color, wherein the composing section generates composite image data on a basis of generated achromatic watermark data and the original image data when the determinating section determines that the original document does not include a chromatic color, the image processing apparatus further comprising:

a display section for displaying an image; and an image display accepting section for accepting execution of display of an image composed by joining an original image with a watermark for copy control on the display section, wherein the generating section corrects the watermark data depending on characteristics of the display section, wherein the composing section joins the original image data with the corrected watermark data when the image display accepting section accepts execution of display, wherein the display section displays a composed image.

10. An image processing method, comprising steps of:

generating watermark data associated with a chromatic or achromatic watermark for copy control, which appears as a result of making a copy;

generating composite image data associated with an image composed by joining an original image with a watermark for copy control, on a basis of the generated watermark data and original image data obtained by reading an original document;

determining whether the original document includes a chromatic color or not on a basis of the original image data;

generating composite image data on a basis of generated watermark data and the original image data when it is determined that the original document includes a chromatic color; and generating composite image data on a basis of generated achromatic watermark data and the original image data when it is determined that the original document does not include a chromatic color, the image processing method further comprising the steps of:

accepting execution of display of an image composed by joining an original image with a watermark for copy control on a display section, wherein the watermark data generating step corrects the watermark data depending on characteristics of the display section, wherein the composite image data generating step joins the original image data with the corrected watermark data when the accepting step accepts execution of display, and displaying a composed image on the display section.

11. A non-transitory computer-readable medium, in which a computer program is recorded,
the computer program comprising steps of:
causing a computer to generate watermark data associated with a chromatic or achromatic watermark for copy control, which appears as a result of making a copy;
causing a computer to generate composite image data associated with an image composed by joining an original image with a watermark for copy control, on a basis of the generated watermark data and original image data obtained by reading an original document;
causing a computer to determine whether the original document includes a chromatic color or not on a basis of the original image data;
causing a computer to generate composite image data on a basis of generated watermark data and the original image data when it is determined that the original document includes a chromatic color; and
causing a computer to generate composite image data on a basis of generated achromatic watermark data and the original image data when it is determined that the original document does not include a chromatic color,
the computer program further comprising the steps of:
causing the computer to accept execution of display of an image composed by joining an original image with a watermark for copy control on a display section,
wherein the watermark data generating step corrects the watermark data depending on characteristics of the display section,
wherein the composite image data generating step joins the original image data with the corrected watermark data when the accepting step accepts execution of display, and
displaying a composed image on the display section.

* * * * *